April 7, 1970     F. M. M. VAN DAMME     3,505,023

THERMALLY CONDITIONED SPOT PLATE

Filed Nov. 13, 1967

INVENTOR,
Frans M. M. Van Damme

BY *Stowell & Stowell*

ATTORNEYS

United States Patent Office 3,505,023
Patented Apr. 7, 1970

3,505,023
THERMALLY CONDITIONED SPOT PLATE
Frans M. M. Van Damme, Blacksburg, Va., assignor to Research Corporation, New York, N.Y., a nonprofit corporation
Filed Nov. 13, 1967, Ser. No. 682,113
Int. Cl. B01l 3/00
U.S. Cl. 23—253
2 Claims

ABSTRACT OF THE DISCLOSURE

A spot plate formed of an elongated member having a central cavity is provided with a plurality of depressions on its top surface. Fluid inlet and outlet connections are carried by the member at its ends thereof to facilitate the passage of a temperature conditioning fluid.

---

This invention relates to a hollow spot plate adapted to contain within depressions on its surface various chemicals used for color reactions in chemistry, biology and the like. Devices of this general type are known and may be seen by reference to U. S. Patents 3,097,070, as well as 3,005,375, and 2,302,830. In general, certain chemicals, reagents, and the like are placed in one or more of the cavities or depressions formed on the top surface and resulting changes in color or other characteristics of the chemicals noted. As an example, a liquid sample is injected or pipetted on one or more of the depressions and a test solution added for reaction.

While many of the reactions do occur at room temperature it is often desirable to either lower or raise the temperature of the reagents used in such reactions. With the prior art spot plates available, no ready means is provided for controlling the temperature of the spot plate and hence the temperature at which reactions will occur in situ on the spot plate. According to the practice of the subject invention, this disadvantage is overcome. The subject invention contemplates a spot plate assuming the general form of an elongated rectangular parallelepiped provided with depressions on its top face. The elongated member is hollow and is provided with fluid inlet and outlet means at each of its ends for the passage therethrough of a temperature conditioning fluid. After thermal equilibrium is reached, the depressions in the hollow spot plate are of the same temperature as the conditioning fluid and the reaction or reactions may then be carried out at their optimum reaction temperature. In general, fluid which is either warmer or cooler than room temperature may be employed and the conditioning fluid may be either a gas or a liquid.

Figure 1:
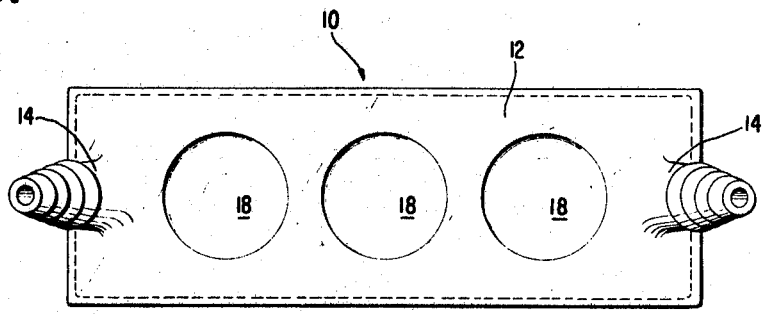
FIG. 1 is a plan view of the hollow spot plate of this invention.
Figure 2:
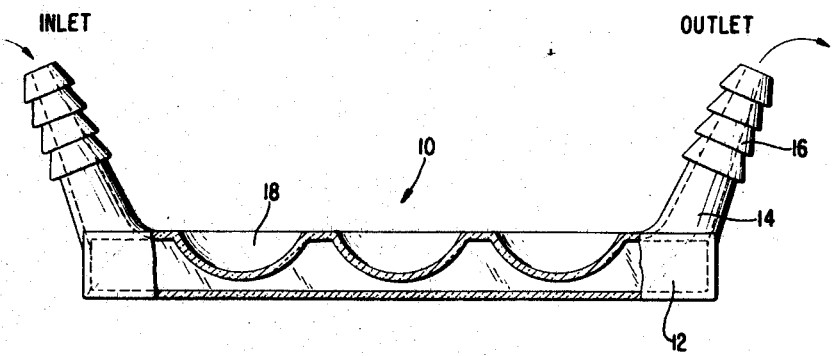
FIG. 2 is a cross sectional view of FIG. 1 along a longitudinal midportion.

Referring now to the drawings, the numeral 10 denotes the hollow spot plate according to this invention and includes a rectangular pipe, denoted by the numeral 12, preferably formed of a refractory material such as Pyrex glass. While not necessary for the practice of this invention, it is preferable that the pipe 12 be transparent as a check upon the flow of a temperature conditioning fluid in event that a liquid is employed. The numeral 14 denotes either one of two passageways integrally formed at the ends of the rectangular pipe 12 and each is provided with conventional ridges 16 to facilitate the attachment of rubber tubing or the like. In the formation of the device, a rectangular glass tube may be heated with a glass blowers' torch at its ends and closed and the hose connections 14 sealed on.

The numeral 18 denotes any one of a plurality of concavities or depressions formed in the top surface of the pipe 12 and are made by heating the glass, for example, on one spot and allowing the glass to simply sink under its own weight until it reaches the desired depth. If desired, suitable indicia may be placed adjacent each of the depressions 18. Other materials of construction may be employed, such as thermosetting resins, and the device may also be fabricated as by molding or casting. In applications where various reaction temperatures are to be used over a short interval of time, a material having relatively high thermal conductivity may be employed.

I claim:

1. A hollow spot plate adapted for color reactions, comprising a closed and hollow container having fluid inlet and outlet connections each in fluid communication with the interior thereof, the container having a top surface, said top surface having at least one depression extending below the surface, said depression adapted to contain liquid samples.

2. The hollow spot plate of claim 1 wherein said container is formed of a transparent and refractory material.

References Cited

UNITED STATES PATENTS 2,363,773  11/1944  Cargille _____ 23—253 XR
3,236,602  2/1966  Isreeli _____ 23—292 XR MORRIS O. WOLK, Primary Examiner
R. M. REESE, Assistant Examiner U.S. Cl. X.R.
23—259, 292